United States Patent [19]

Arlauskas et al.

[11] 4,045,079
[45] Aug. 30, 1977

[54] INERTIA SEAT BACK LOCK

[75] Inventors: Alfonsas Arlauskas, Troy; Richard D. Loose, Birmingham, both of Mich.

[73] Assignee: General Motors Corporation, Detroit, Mich.

[21] Appl. No.: 686,693

[22] Filed: May 17, 1976

[51] Int. Cl.² .................. B60R 21/10; A47C 1/00
[52] U.S. Cl. ...................... 297/216; 242/107.4 A; 297/379; 297/389
[58] Field of Search ............... 297/216, 354, 361, 378, 297/379, 389; 242/107.4 A

[56] References Cited

U.S. PATENT DOCUMENTS

| 3,638,999 | 2/1972 | Tischler | 297/379 |
| 3,814,475 | 6/1974 | Slabon et al. | 297/361 |
| 3,913,861 | 10/1975 | Stephenson et al. | 242/107.4 A |
| 3,948,460 | 4/1976 | Kondziola | 242/107.4 A |

FOREIGN PATENT DOCUMENTS

| 2,228,637 | 12/1974 | France | 297/216 |
| 2,054,917 | 5/1972 | Germany | 297/216 |
| 2,246,184 | 4/1974 | Germany | 297/216 |

Primary Examiner—Roy D. Frazier
Assistant Examiner—William E. Lyddane
Attorney, Agent, or Firm—Herbert Furman

[57] ABSTRACT

An inertia seat back lock includes a frame secured to the seat cushion member and having side walls pivotally supporting the shaft portion of a reel. A coil spring secured to the shaft portion and an abutment of one side wall biases the reel in a winding direction. A strap secured to the reel and to the pivoted seat back member normally permits free pivoting movement of the back member relative to the cushion member as the reel unwinds and winds. An inertia responsive member pivoted to the frame includes a pawl portion traversing toothed end plates of the reel and a pair of extensions overlying the shaft portion and located between the end plates and the frame side walls. The center of gravity of the inertia member normally locates the pawl portion out of the path of the end plates. When a predetermined deceleration level is exceeded, the inertia member pivots relative to the frame and the pawl portion engages one tooth of each of the end plates to block forward tilting movement of the back member relative to the cushion member. The flexible strap takes up a portion of the shock loads. The spring is initially preloaded and hooked to the reel. When the reel is assembled to the frame and the strap is initially unwound, the outer end of the spring is transferred to the abutment of the frame side wall.

5 Claims, 6 Drawing Figures

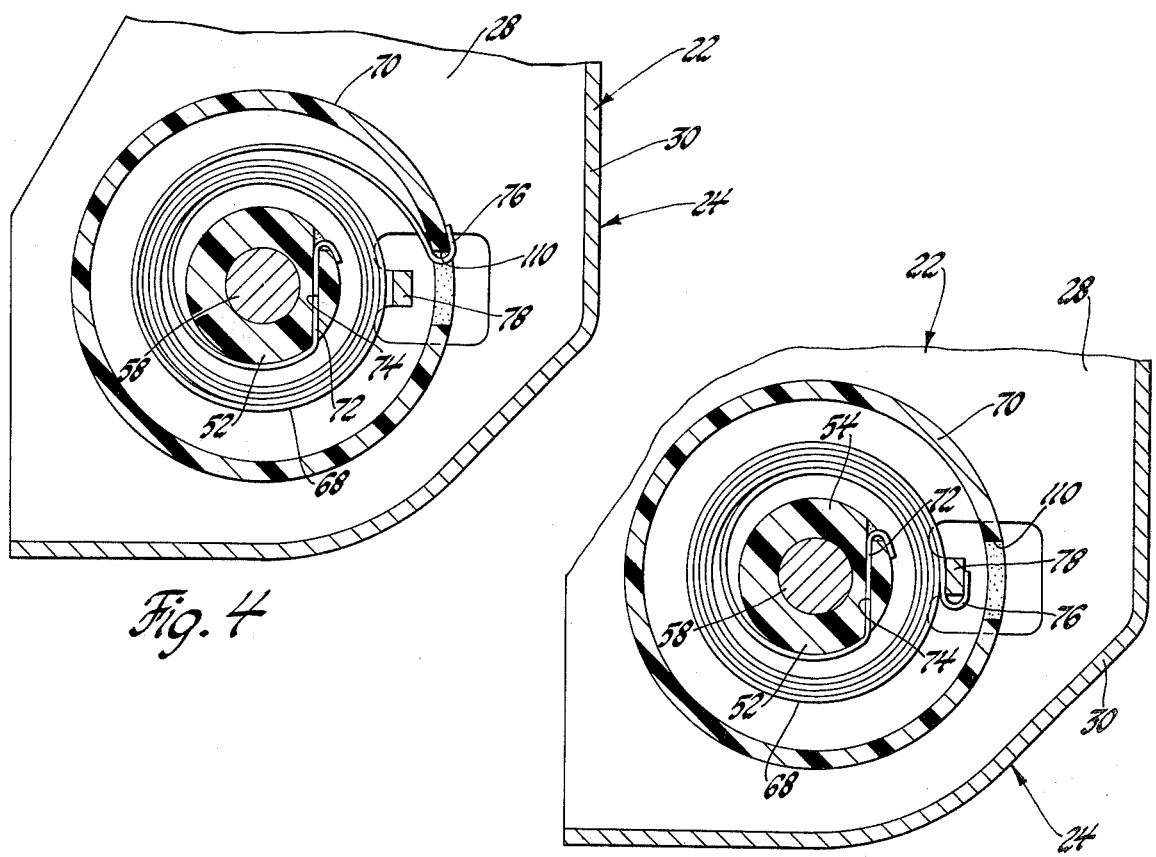
Fig. 4
Fig. 5
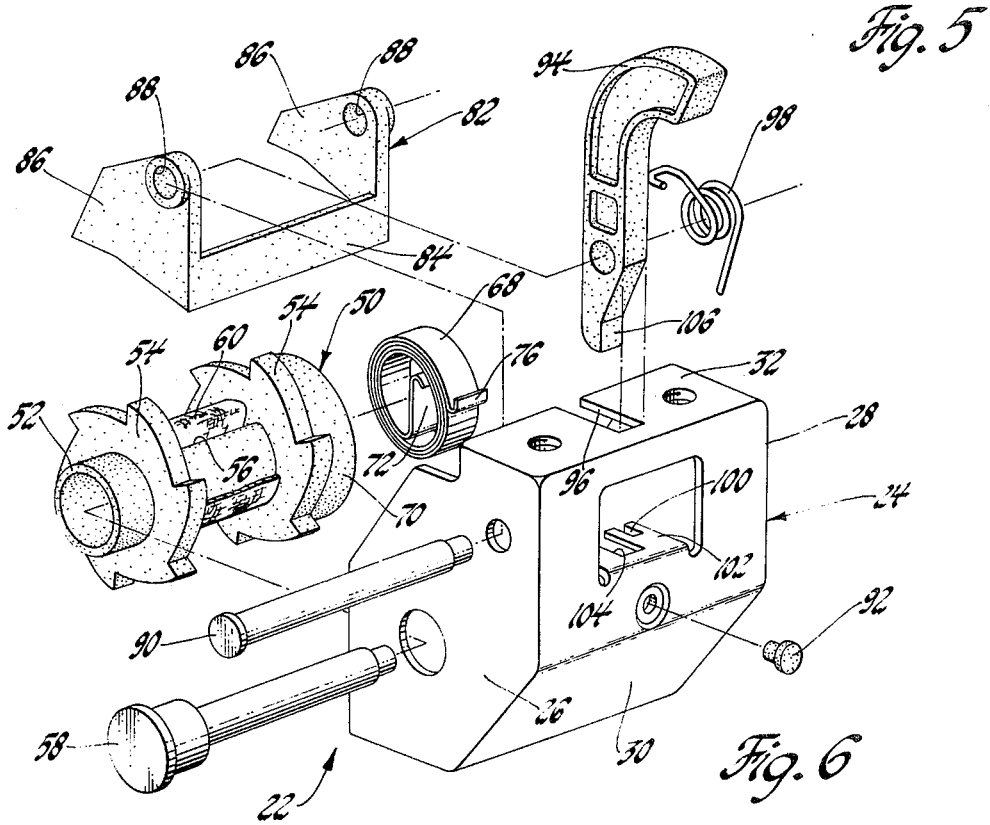
Fig. 6

INERTIA SEAT BACK LOCK

This invention relates generally to inertia seat back locks and more particularly to an improved inertia seat back lock including a flexible strap interconnecting the tilting seat back member and the seat cushion member and being wound and unwound relative to a reel controlled by an inertia responsive member.

Inertia responsive seat back locks are well known. Generally these locks include an inertia responsive latch or member which is pivoted on one seat member and engages the other seat member under inertial forces to thereby lock the seat back to the seat cushion against tilting movement. U.S. Pat. Nos. 2,732,003 Williams, 2,737,229 Semar, 2,873,794 Leslie et al, and Ser. No. 553,298, Arlauskas et al, filed Feb. 26, 1975 and assigned to the assignee of this invention, are representative of this type of inertia seat back lock. It is also known to provide an inertia responsive member on the seat back engageable under inertia forces with a pivoted link between the seat back and seat cushion to thereby block forward tilting movement of the seat back. Tischler U.S. Pat. No. 3,638,999 is representative of this type of lock.

This invention provides an improved inertia seat back lock wherein forward tilting movement of the seat back relative to the seat cushion is normally freely permitted by the unwinding movement of a flexible strap relative to a reel. The reel is spring biased in a strap winding direction to insure that the strap is retracted and wound around the reel when the seat back is restored to its normal position from a forwardly tilted position. An inertia responsive member normally permits rotational movement of the reel and the winding and unwinding movement of the strap. However, when the inertial loads exceed a predetermined level, the inertia member pivots relative to the reel and engages respective teeth of spaced end plates of the reel to block movement of the reel in an unwinding direction and consequently block forward tilting movement of the seat back. A manual release latch is provided for the inertia responsive member.

This invention also includes an improved manner of interconnecting the spring between the reel and the frame upon initial unwinding movement of the strap from the reel. The reel includes an annular housing at one end thereof which is located between one of the toothed end plates and a side wall of the frame supporting the reel. A coil spring within the housing has an inner end hooked to the shaft portion of the reel and an outer hooked end wound relative to the inner end and releasably hooked to the housing wall. An abutment of the frame projects into the housing and is located radially inwardly of and circumferentially behind the outer hooked end of the spring in an unwinding direction. Upon initial unwinding movement of the strap, the frame abutment picks up the outer end of the spring and transfers it from the housing to the frame to thereby bias the reel in a winding direction.

The primary feature of this invention is that it provides an improved vehicle seat back lock wherein a flexible strap interconnects the seat cushion and seat back and limits forward tilting movement of the seat back relative to the seat cushion when the unwinding of the strap relative to a reel is blocked by an inertia responsive member. Another feature is that the reel is spring biased in a strap winding direction to normally wind the strap thereon when the seat back is in its normal position or is moved from a forwardly tilted position to such normal position. A further feature is that the reel includes a pair of end plates having axially aligned pairs of radial facing teeth and the inertia responsive member is engageable under inertial forces with one such aligned pair of teeth to block inertial forces with one such aligned pair of teeth to block unwinding movement of the strap. Yet another feature is that the inertia responsive member includes a pawl portion traversing the strap and teeth and a pair of extensions which pivotally support the pawl portion on the lock frame and which locate the center of gravity of the inertia responsive member such as to normally maintain the pawl portion out of engagement with the teeth of the end plates. Yet a further feature is that the reel and the inertia responsive member are integrally formed of molded plastic material. Still another feature is that the spring for the reel is initially assembled to the reel in a preloaded condition and is automatically connected between the reel and the frame upon initial unwinding movement of the reel relative to the frame to thereafter bias the reel in a winding direction relative to the frame.

These and other features will be readily apparent from the following specification and drawings wherein:

FIG. 4 is an enlarged view showing the spring initially assembled to the reel in a preloaded condition;

FIG. 5 is a view taken generally along the plane indicated by line 5—5 of FIG. 3 and showing the preloaded spring connected to the frame, and FIG. 6 is an exploded perspective view.

Figure 1:
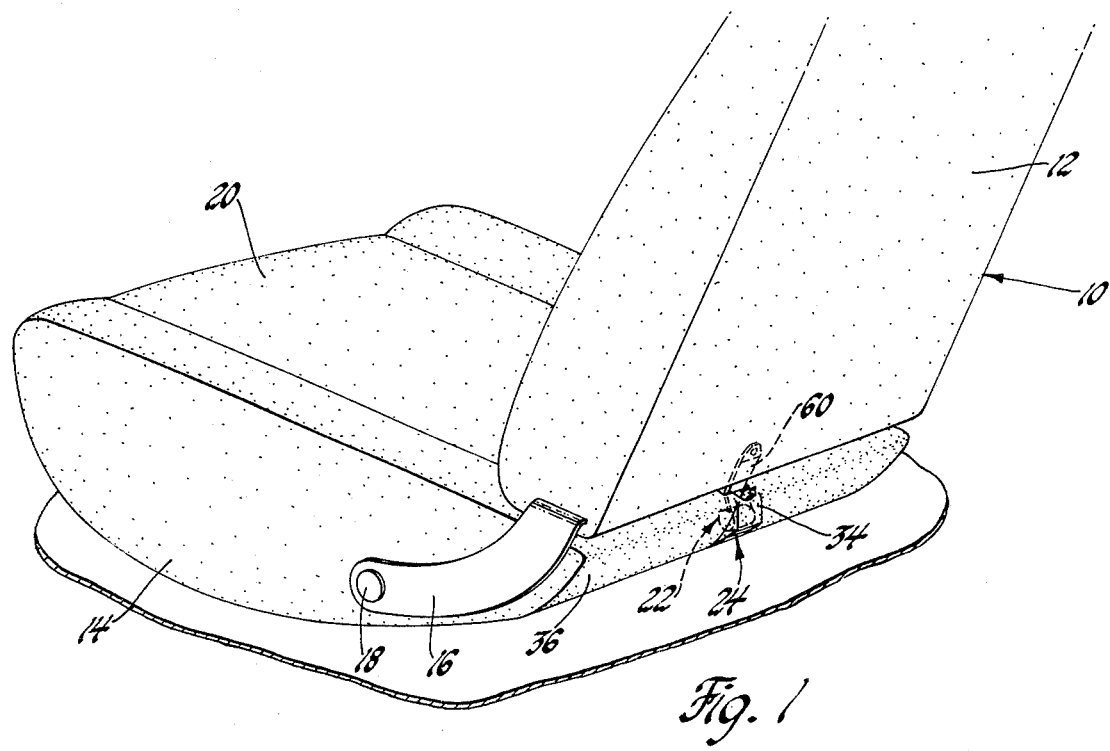
FIG. 1 is a perspective view of a vehicle seat embodying a seat back lock according to this invention.

Referring now particularly to FIG. 1 of the drawings a vehicle seat designated generally 10 includes a seat back member 12 and a seat cushion member 14, both of which are formed of molded plastic material. The back member 12 includes extensions 16 which extend downwardly and are pivoted at 18 to the side walls of cushion member 14 to thereby provide for tilting movement of the back member between a normal or upright position as shown in FIG. 1 and a forwardly tilted position, not shown, wherein the back member 12 is moved to a generally horizontal position over the cushion member 14. The back member 12 and cushion member 14 each mount a resilient pad 20 to provide for passenger comfort. The details of the cushion and back members and pads are not shown since they form no part of this invention.

An inertia responsive seat back lock 22 interconnects the cushion member 14 and the back member 12 and normally permits forward tilting movement of the back member 12 relative to the cushion member 14 unless inertial forces on the cushion member exceed a predetermined level. When such forces are applied to the cushion member 14, the lock 22 immediately limits any forward tilting movement of the back member relative to the cushion member or blocks any further such movement if it has been initiated.

Figures 2, 3:
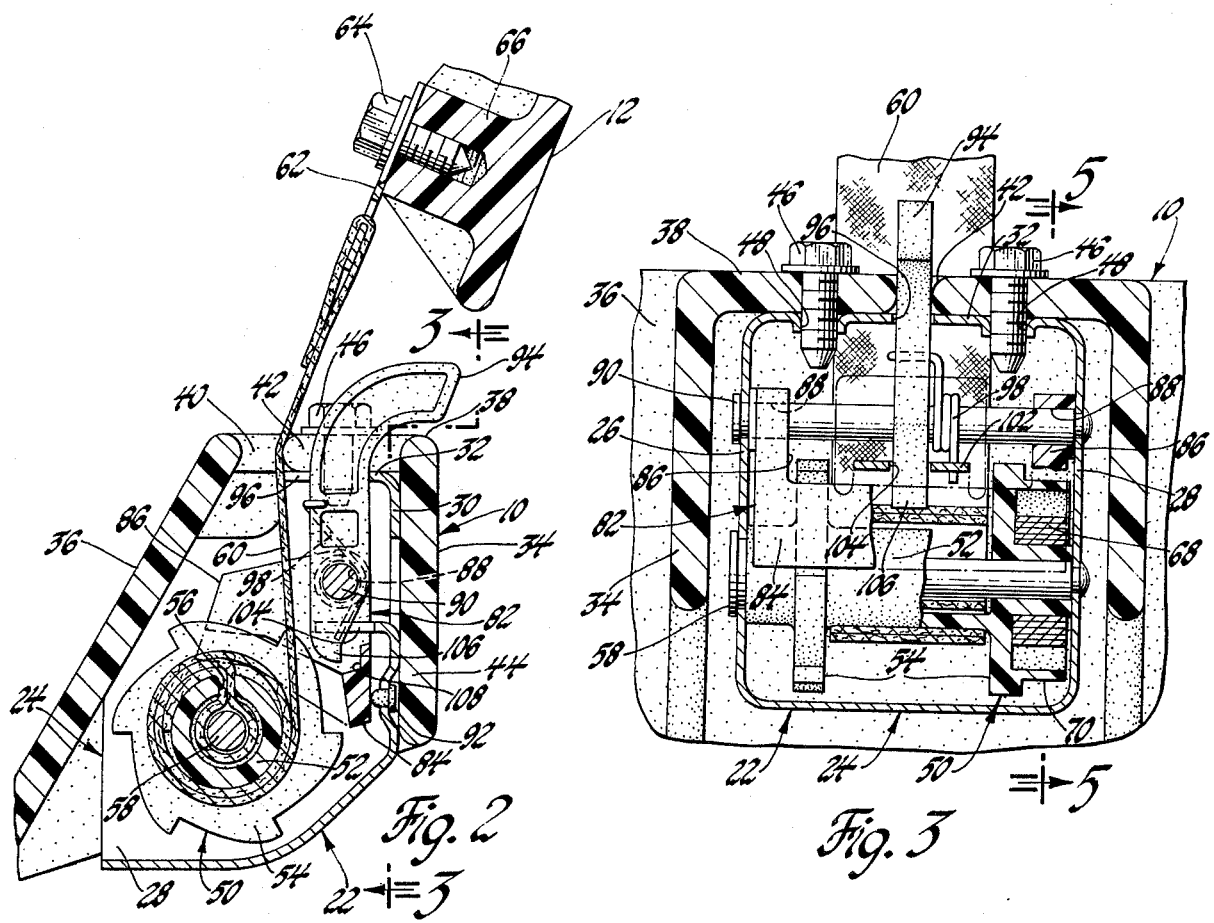
FIG. 2 is an enlarged sectional view of a portion of FIG. 1.
FIG. 3 is a view taken generally along the plane indicated by line 3—3 of FIG. 2.

Referring now particularly to FIGS. 2, 3 and 6, the lock 22 includes a stamped metal frame 24 having side walls 26 and 28, a rear wall 30 and an upper wall 32. As best shown in FIGS. 2 and 3, the seat cushion 14 includes an integral generally U-shaped extension 34 which projects rearwardly from the rear wall 36 thereof. The upper wall 38 of this extension includes a generally T-shaped slot having a lateral slot portion 40 and a longitudinal slot portion 42.

When the frame 24 is inserted within the housing 34, the rear wall 30 abuts the rear wall 44 of the housing, the side walls 26 and 28 abut the rear wall 36 of the seat, and the upper wall 32 abuts the upper wall 38 of the housing 34. The frame 24 is secured in place by a pair of bolts 46 which extend through apertures in the upper wall of the housing 44 and into extruded tapped openings 48 of the upper wall 32 of frame 24.

A reel 50 of molded plastic material includes a hollow shaft portion 52, a pair of integrally toothed end plates 54 and a longitudinal slot 56 in the shaft portion between the plates 54. A headed pin 58 extends through aligned apertures in the side walls 26 and 28 and through the stepped bore of the shaft portion 52 to pivotally mount the reel 50 on frame 24. A strap 60 has an inner looped end extending through slot 56 into the shaft portion 52 and receiving the pin 58 to thereby anchor the inner end of the strap to the reel. The strap is wound about the reel as shown in FIG. 2 and extends upwardly of the seat cushion 14 through the slot portion 40 of extension 34. The outer looped end of the strap mounts an attachment plate 62 which is bolted at 64 to an integral abutment 66 of the seat back 12.

A coil spring 68 is housed within an integral annular housing 70 of the reel 50 as shown in FIG. 3. The inner hooked end 72 of the spring is received within a slot 74 in one end of shaft portion 52 to anchor the spring to the reel 50. The outer hooked end 76 of the spring is hooked to an integral inwardly extending tab 78 of side wall 28, FIG. 5. Spring 68 continuously biases the reel 50 in a strap winding direction relative to the frame 24 or clockwise as viewed in FIGS. 2 and 5. The tab 78 is provided in wall 28 by lancing out an integral portion of wall 28 and bending such portion laterally relative to the wall. The manner in which the outer hooked end 76 of the spring is secured to the tab 78 is explained in detail hereinafter.

An inertia responsive member 82 of molded plastic material includes a pawl portion 84 and a pair of extensions or side wings 86, each of which is provided with an integral bushed opening 88. The member 82 fits between the side walls 26 and 28 of frame 24 and a pin 90 extending through aligned openings of these walls pivotally mounts the member 82 on the frame 24. It will be noted with reference to FIG. 2 that the extensions 86 are located intermediate the end plates 54 and the respective side walls of frame 24 and in overlying relationship to the shaft portion 52. The extensions 86 are arranged so as to locate the center of gravity of member 82 in a plane 18° clockwise of a vertical plane through the axis of pin 90 to thereby provide an integral bias on this member normally biasing it in a counterclockwise direction and toward the rear wall 30 of frame 24. Such wall is provided with a rubber bumper 92 which is engaged by the pawl portion 84 as shown in FIG. 2 to thereby normally locate the pawl portion 84 of the inertia member 82 out of the path of movement of the teeth of the end plates 54. The extensions 86 do not engage the shaft portion 52, FIG. 2. The strap 60 extends outwardly of the reel 50 between the extensions and forwardly of the pawl portion 84.

A molded plastic release lever 94 is rotatably mounted on the pin 90 and fits within a slot 96 of frame 24 and the slot portion 42 of wall 38. A coil torsion spring 98 on pin 90 has one end hooked to the lever 94 and the other end received within a slot 100, FIG. 6, of an integral tab 102 of frame 24. Spring 98 biases the lever 94 clockwise as viewed in FIG. 2 and into engagement with the rear wall of slot 96 to thereby locate the lever. The lever 94 also extends through a slot 104 of flange 102 so that this slot and slot 96 control the position of the lever axially of the pin 90. The inner end 106 of the lever is normally located in spaced adjacent relationship, FIG. 2, to a wall 108 of the pawl portion 84 of inertia member 82. Should the pawl portion 84 of the inertia member be engaged with aligned teeth of the plates 54, as will be hereinafter described, it can be seen that counterclockwise movement of lever 94 will engage end 106 with wall 108 to move the inertia member 82 counterclockwise to its position shown in FIG. 2.

The seat back member 12 can be pivoted forwardly of the seat cushion member 14 or to the left as viewed in FIG. 1 whenever desired. During such movement, the strap 60 is unwound from the reel 50 as the reel rotates in a strap unwinding direction or counterclockwise as viewed in FIG. 2 against the bias of spring 68. When the seat back member 12 is returned to its normal upright position, as shown in FIG. 1, the bias of the spring 68 rotates the reel 50 in a belt winding direction or clockwise as viewed in FIG. 2 to thereby wind the strap on the reel. During this winding and unwinding movement of the reel, the inertia member 82 stays in its position as shown in FIG. 2 under the influence of gravity.

Should the seat cushion member 14 be subjected to inertial forces exceeding a predetermined level, the inertia member 82 will rotate clockwise of the pin 90 as viewed in FIG. 2 and thereby engage the pawl portion 84 of this member with an aligned pair of teeth of the end plates 54. This will block counterclockwise rotation of the reel 50 or rotation in a strap unwinding direction and thereby block tilting movement of the seat back member 12 relative to the seat cushion member 14. It will be noted that the engagement of the pawl portion 84 with the teeth of end plates 54 places the extensions 86 in compression between such teeth and the pin 90. Further, the strap 60 is woven of flexible material such as nylon or polyester and absorbs part of the shock loads caused by sharp arresting of the forward tilting movement of the seat back member 12 relative to the seat cushion member 14. Such movement of the seat back member is under the same inertial forces as applied to the seat cushion member 14 and to the inertia member 82. Upon cessation of such inertial forces or their reduction below a predetermined level, gravity will tend to return the seat back member 12 to its normal upright position and return the inertia member 82 to its position shown in FIG. 2 wherein the pawl portion 84 is out of engagement with the teeth of the plates 54. The release lever 94 can also be operated to move the pawl portion 84 out of engagement with the teeth of plates 54.

As previously mentioned, one of the features of this invention is the connection of the spring 68 with the abutment 78 to provide a winding bias on the reel 50. The spring 68 is initially assembled to the reel 50 as shown in FIG. 4 prior to the reel being assembled to frame 24. The spring in free position is first placed within the housing 70 about the shaft portion 52. The inner end 72 of the spring is assembled within the slot 74 of the shaft portion. The outer hooked end 76 of the spring is wound clockwise approximately 1½ turns from its free position and hooked to an edge 110 of the outer radial wall of housing 70. This provides a module of the reel 50 and preloaded spring 68. The module and the belt 60 are then assembled to the frame 24 by inserting the pin 58 through walls 26 and 28 and the inner looped end of the belt. This assembly of the reel, belt and frame is made with the belt wound relative to the reel and with the outer end 76 and edge 110 located relative to tab 78 as shown in FIG. 4. During this initial assembly, there is no bias of spring 68 on the reel 50 since the spring has both of its ends connected to the reel. After the assembly of the module and frame, the outer end 76 of the spring will be positioned radially outwardly of and circumferentially ahead of tab 78 in an unwinding direction as shown in FIG. 4. Thereafter, upon initial unwinding movement of the belt 60, the reel 50 will freely rotate in a belt unwinding direction or counter-clockwise as viewed in FIG. 4, and the spring 68 will rotate with the reel. When the reel and spring have almost completed one full revolution, the outer surface of the spring, adjacent the hooked end 76, will engage and move relative to tab 78 until this tab engages the end 76 and transfer this end of the spring from the reel to the frame, as shown in FIG. 5. The spring thereafter provides a winding bias on the reel 50 in the winding direction or clockwise as viewed in FIG. 5. This transfer of the spring bias from the reel to the frame can occur either before or after the assembly of the frame 24 to the seat cushion member 14.

Thus this invention provides an improved inertia seat back lock.

We claim:

1. An inertia seat back lock for a seat back member pivotal relative to a seat cushion member comprising, in combination, a frame secured to one of the members and including spaced side walls, a reel including a shaft portion and a pair of toothed plates, each located adjacent a respective side wall and including a plurality of radially extending teeth, means rotatably mounting the shaft portion on the frame side walls, a strap secured at one end of the reel for winding and unwinding therefrom, means securing the other end of the strap to the other member, spring means located between a respective plate and side wall and interconnecting the reel and frame to normally bias the reel in a strap winding direction, and an inertia responsive member having a pawl portion traversing the reel plates and a pair of extensions located between a reel plate and respective frame side wall, means pivotally mounting the extensions on the frame side walls and positioning the pawl portion to one side of the pivotal mounting means and the extensions to the other side thereof, the extensions being of predetermined weight and locating the center of gravity of the inertia member to the other side of the pivotal mounting means to normally bias the inertia member in one direction about the pivotal mounting means, and means limiting movement of the inertia member in the one direction to locate the pawl portion of the inertia member in a predetermined position out of the path of the teeth of the reel plates, a predetermined seat deceleration level pivoting the inertia member in the other direction relative to the pivotal mounting means and engaging the pawl portion with one tooth of each reel plate to block unwinding movement of the strap and pivotal movement of the seat back member relative to the seat cushion member.

2. An inertia seat back lock for a seat back member pivotal relative to a seat cushion member comprising, in combination, a frame secured to one of the members and including spaced side walls, a reel including a shaft portion and a pair of toothed plates each located adjacent a respective side wall and including a plurality of radially extending teeth, means rotatably mounting the shaft portion on the frame side walls, a strap secured at one end to the reel for winding and unwinding therefrom, means securing the other end of the strap to the other member, spring means located between a respective plate and side wall and interconnecting the reel and frame to normally bias the reel in a strap winding direction, and an inertia responsive member having a pawl portion traversing the reel plates and a pair of extensions located between a reel plate and respective frame side wall, means pivotally mounting the extensions on the frame side walls and positioning the pawl portion to one side of the pivotal mounting means and the extensions to the other side thereof, the extensions being of predetermined weight and locating the center of gravity of the inertia member to the other side of the pivotal mounting means to normally bias the inertia member in one direction about the pivotal mounting means, means limiting movement of the inertia member in the one direction to locate the pawl portion of the inertia member in a predetermined position out of the path of the teeth of the reel plates, a predetermined seat deceleration level pivoting the inertia member in the other direction relative to the pivotal mounting means and engaging the pawl portion with one tooth of each reel plate to block unwinding movement of the strap and pivotal movement of the seat back member relative to the seat cushion member, release means engageable with the inertia member to move the pawl portion out of engagement with the reel plates and means normally locating the release means in a position out of engagement with the inertia member.

3. An inertia seat back lock for a seat back member pivotal relative to a seat cushion member comprising, in combination, a frame secured to one of the members and including spaced side walls, an integral plastic reel including a shaft portion, a pair of toothed plates including a plurality of radially extending teeth, and a pair of hub portions, each located adjacent a respective side wall, means rotatably mounting the reel on the frame side walls, a strap secured at one end to the reel for winding and unwinding therefrom, means securing the other end of the strap to the other member, spring means located within one of the hub portions and interconnecting the reel and one frame side wall to normally bias the reel in a strap winding direction, and an inertia responsive member having a pawl portion traversing the reel plates and a pair of extensions, each traversing a hub portion and located between a reel plate and respective frame side wall, means pivotally mounting the extensions on the frame side walls and positioning the pawl portion to one side of the pivotal mounting means and the extensions to the other side thereof, the extensions being of predetermined weight and locating the center of gravity of the inertia member to the other side of the pivotal mounting means to normally bias the inertia member in one direction about the pivotal mounting means, means limiting movement of the inertia member in the one direction to locate the pawl portion of the inertia member in a predetermined position out of the path of the teeth of the reel plates, a predetermined seat deceleration level pivoting the inertia member in the other direction relative to the pivotal mounting means and engaging the pawl portion with one tooth of each reel plate to block unwinding movement of the strap and pivotal movement of the seat back member relative to the seat cushion member.

4. An inertia seat back lock for a seat back member pivotal relative to a seat cushion member comprising, in combination, a frame secured to one of the members and including spaced side walls, an integral plastic reel including a shaft portion, a pair of toothed plates including a plurality of radially extending teeth, and a pair of hub portions, each located adjacent a respective side wall, means rotatably mounting the reel on the frame side walls, a strap secured at one end to the reel for winding and unwinding therefrom, means securing the other end of the strap to the other member, spring means located within one of the hub portions and interconnecting the reel and one frame side wall to normally bias the reel in a strap winding direction, and an integral plastic inertia responsive member having a pawl portion traversing the reel plates and a pair of extensions, each overlying in spaced relationship a respective hub portion and located between a reel plate and respective frame side wall, means pivotally mounting the extensions on the frame side walls and positioning the pawl portion to one side of the pivotal mounting means and the extensions to the other side thereof, the extensions being of predetermined weight and locating the center of gravity of the inertia member to the other side of the pivotal mounting means to normally bias the inertia member in one direction about the pivotal mounting means, means limiting movement of the inertia member in the one direction to locate the pawl portion of the inertia member in a predetermined position out of the path of the teeth of the reel plates, a predetermined seat deceleration level pivoting the inertia member in the other direction relative to the pivotal mounting means and engaging the pawl portion with one tooth of each reel plate to block unwinding movement of the strap and pivotal movement of the seat back member relative to the seat cushion member.

5. An inertia seat back lock for a seat back member pivotal relative to a seat cushion member comprising, in combination, a frame secured to one of the members and including spaced side walls, an integral plastic reel including a shaft portion, a pair of toothed plates including a plurality of radially extending teeth, and a pair of hub portions, each located adjacent a respective side wall, means rotatably mounting the reel on the frame side walls, a strap secured at one end to the reel for winding and unwinding therefrom, means securing the other end of the strap to the other member, spring means located within one of the hub portions and interconnecting the reel and one frame side wall to normally bias the reel in a strap winding direction, and an integral plastic inertia responsive member having a pawl portion traversing the reel plates and a pair of extensions, each traversing a hub portion and located between a reel plate and respective frame side wall, means pivotally mounting and extensions on the frame side walls and positioning the pawl portion to one side of the pivotal mounting means and the extensions to the other side thereof, the extensions being of predetermined weight and locating the center of gravity of the inertia member to the other side of the pivotal mounting means to normally bias the inertia member in one direction about the pivotal mounting means, means limiting movement of the inertia member in the one direction to locate the pawl portion of the inertia member in a predetermined position out of the path of the teeth of the reel plates, a predetermined seat deceleration level pivoting the inertia member in the other direction relative to the pivotal mounting means and engaging the pawl portion with one tooth of each reel plate to block unwinding movement of the strap and pivotal movement of the seat back member relative to the seat cushion member, a manual release member coaxially pivoted with the inertia responsive member and engageable with the pawl portion to move the pawl portion out of engagement with the reel plates and means normally locating the release member in a position out of engagement with the pawl portion.

* * * * *